United States Patent
Beyer et al.

(10) Patent No.: US 10,718,217 B2
(45) Date of Patent: Jul. 21, 2020

(54) ENGINE COMPONENT WITH COOLING PASSAGES

(71) Applicant: General Electric Company, Schenectady, NY (US)

(72) Inventors: Matthew Thomas Beyer, West Chester, OH (US); Gregory Terrence Garay, West Chester, OH (US); Tingfan Pang, West Chester, OH (US); Aaron Ezekiel Smith, Montgomery, OH (US)

(73) Assignee: General Electric Company, Schenectady, NY (US)

( * ) Notice: Subject to any disclaimer, the term of this patent is extended or adjusted under 35 U.S.C. 154(b) by 329 days.

(21) Appl. No.: 15/622,266

(22) Filed: Jun. 14, 2017

(65) Prior Publication Data

US 2018/0363468 A1   Dec. 20, 2018

(51) Int. Cl.
  *F01D 5/18*   (2006.01)
  *F23R 3/00*   (2006.01)
  *F01D 5/14*   (2006.01)

(52) U.S. Cl.
  CPC ............ *F01D 5/187* (2013.01); *F01D 5/141* (2013.01); *F23R 3/005* (2013.01); *F05D 2240/304* (2013.01); *F05D 2260/22141* (2013.01); *F23R 2900/00018* (2013.01); *F23R 2900/03043* (2013.01)

(58) Field of Classification Search
  CPC ................................ F01D 5/186; F01D 5/187
  See application file for complete search history.

(56) References Cited

U.S. PATENT DOCUMENTS

| | | | |
|---|---|---|---|
| 4,752,186 A * | 6/1988 | Liang | F01D 5/187 416/97 R |
| 5,243,759 A | 9/1993 | Brown et al. | |
| 5,288,207 A * | 2/1994 | Linask | F01D 5/187 416/97 R |
| 6,071,075 A | 6/2000 | Tomita et al. | |
| 6,129,515 A | 10/2000 | Soechting et al. | |
| 6,179,565 B1 * | 1/2001 | Palumbo | F01D 5/187 415/115 |
| 6,213,714 B1 | 4/2001 | Rhodes | |
| 6,234,754 B1 * | 5/2001 | Zelesky | F01D 5/187 415/115 |
| 6,481,966 B2 * | 11/2002 | Beeck | B22D 11/0405 415/115 |
| 6,890,154 B2 * | 5/2005 | Cunha | F01D 5/187 415/115 |
| 6,896,487 B2 * | 5/2005 | Cunha | F01D 5/186 415/115 |
| 7,014,424 B2 * | 3/2006 | Cunha | B22C 9/103 415/115 |
| 7,097,425 B2 * | 8/2006 | Cunha | F01D 5/186 415/115 |

(Continued)

*Primary Examiner* — Eldon T Brockman
(74) *Attorney, Agent, or Firm* — General Electric Company; James L. Reed

(57) ABSTRACT

An apparatus and method for cooling an airfoil or engine component can include an outer wall defining an interior. A cooling circuit can be provided in the interior for directing flow of fluid and defining a flow direction. A plurality of cooling conduits can be arranged in the cooling circuit and organized into two or more sets of rows.

20 Claims, 7 Drawing Sheets

(56) References Cited

U.S. PATENT DOCUMENTS

| | | | |
|---|---|---|---|
| 7,121,787 B2* | 10/2006 | Jacks | F01D 5/186 |
| | | | 415/115 |
| 7,186,085 B2 | 3/2007 | Lee | |
| 7,296,973 B2* | 11/2007 | Lee | F01D 5/187 |
| | | | 416/97 R |
| 7,452,186 B2* | 11/2008 | Charbonneau | F01D 5/187 |
| | | | 416/97 R |
| 7,686,580 B2* | 3/2010 | Cunha | B22C 9/103 |
| | | | 415/115 |
| 7,780,414 B1* | 8/2010 | Liang | B22C 9/10 |
| | | | 164/369 |
| 7,862,299 B1* | 1/2011 | Liang | F01D 5/147 |
| | | | 416/97 R |
| 7,985,049 B1* | 7/2011 | Liang | F01D 5/186 |
| | | | 416/97 R |
| 8,109,726 B2 | 2/2012 | Liang | |
| 8,261,810 B1* | 9/2012 | Liang | B22C 9/10 |
| | | | 164/122.1 |
| 8,398,370 B1* | 3/2013 | Liang | F01D 5/187 |
| | | | 416/97 R |
| 8,770,920 B2 | 7/2014 | Naik et al. | |
| 8,807,943 B1* | 8/2014 | Liang | F01D 5/187 |
| | | | 415/115 |
| 8,985,949 B2* | 3/2015 | Lee | F01D 5/187 |
| | | | 416/97 R |
| 9,328,617 B2 | 5/2016 | Gautschi et al. | |
| 9,366,144 B2 | 6/2016 | Zess et al. | |
| 10,156,146 B2* | 12/2018 | Walunj | F01D 5/187 |
| 2001/0012484 A1* | 8/2001 | Beeck | B22D 11/0405 |
| | | | 416/97 R |
| 2004/0202542 A1* | 10/2004 | Cunha | B22C 9/103 |
| | | | 416/97 R |
| 2005/0031450 A1* | 2/2005 | Cunha | F01D 5/186 |
| | | | 416/97 R |
| 2005/0031451 A1* | 2/2005 | Cunha | F01D 5/187 |
| | | | 416/97 R |
| 2005/0053459 A1* | 3/2005 | Cunha | F01D 5/186 |
| | | | 415/115 |
| 2005/0244264 A1* | 11/2005 | Jacks | F01D 5/186 |
| | | | 415/115 |
| 2006/0222494 A1* | 10/2006 | Liang | F01D 5/187 |
| | | | 416/97 R |
| 2007/0041835 A1* | 2/2007 | Charbonneau | F01D 5/187 |
| | | | 416/97 R |
| 2007/0237639 A1* | 10/2007 | Cunha | B22C 9/103 |
| | | | 416/97 R |
| 2014/0321980 A1* | 10/2014 | Lee | F01D 5/187 |
| | | | 415/115 |
| 2016/0333699 A1* | 11/2016 | Downey, Jr. | F01D 5/187 |
| 2017/0306765 A1* | 10/2017 | Walunj | F01D 5/187 |
| 2018/0306037 A1* | 10/2018 | Takaoka | F01D 5/18 |

* cited by examiner

ENGINE COMPONENT WITH COOLING PASSAGES

BACKGROUND OF THE INVENTION

Turbine engines, and particularly gas or combustion turbine engines, are rotary engines that extract energy from a flow of combusted gases passing through the engine onto a multitude of rotating turbine blades.

Gas turbine engines for aircraft are designed to operate at high temperatures to maximize engine efficiency, so cooling of certain engine components, such as the high pressure turbine and the low pressure turbine, can be beneficial. Typically, cooling is accomplished by ducting cooler air from the high and/or low pressure compressors to the engine components that require cooling. Temperatures in the high pressure turbine are around 1000° C. to 2000° C. and the cooling air from the compressor is around 500° C. to 700° C. While the compressor air is a high temperature, it is cooler relative to the turbine air, and can be used to cool the turbine.

Contemporary turbine blades generally include one or more interior cooling circuits for routing the cooling air through the blade to cool different portions of the blade, and can include dedicated cooling circuits for cooling different portions of the blade, such as the leading edge, trailing edge and tip of the blade.

BRIEF DESCRIPTION OF THE INVENTION

In one aspect, the disclosure relates to an airfoil for a turbine engine including an outer wall defining an interior and including a pressure side and a suction side extending axially between a leading edge and a trailing edge defining a chord-wise direction and extending radially between a root and a tip defining a span-wise direction. A cooling circuit defining a flow direction includes a plurality of cooling conduits provided in the interior and arranged into a first row and a second row downstream of the first row relative to the flow direction. The cooling conduits in the first row have a greater cross-sectional area than the cooling conduits in the second row.

In another aspect, the disclosure relates to a component for a turbine engine including a plurality of interior walls defining a plurality of cooling conduits arranged into a first row and a second row downstream of the first row relative to a flow direction through the cooling passage. The cooling conduits in the second row have a smaller cross-sectional area than the cooling conduits in the first row.

In yet another aspect, the disclosure relates to a method of cooling an airfoil for a turbine engine, the airfoil having an inlet, an interior, and a plurality of exhaust holes from the interior to an exterior of the airfoil, the method including: directing a flow of fluid from an inlet to the plurality of exhaust holes through a first set of cooling conduits arranged in the interior in a first row having a first cross-sectional area; and directing the flow of fluid through a second set of cooling conduits arranged in the interior in a second row downstream of the first row and having a second cross-sectional area less than the first cross-sectional area.

DETAILED DESCRIPTION OF THE INVENTION

Figure 1:
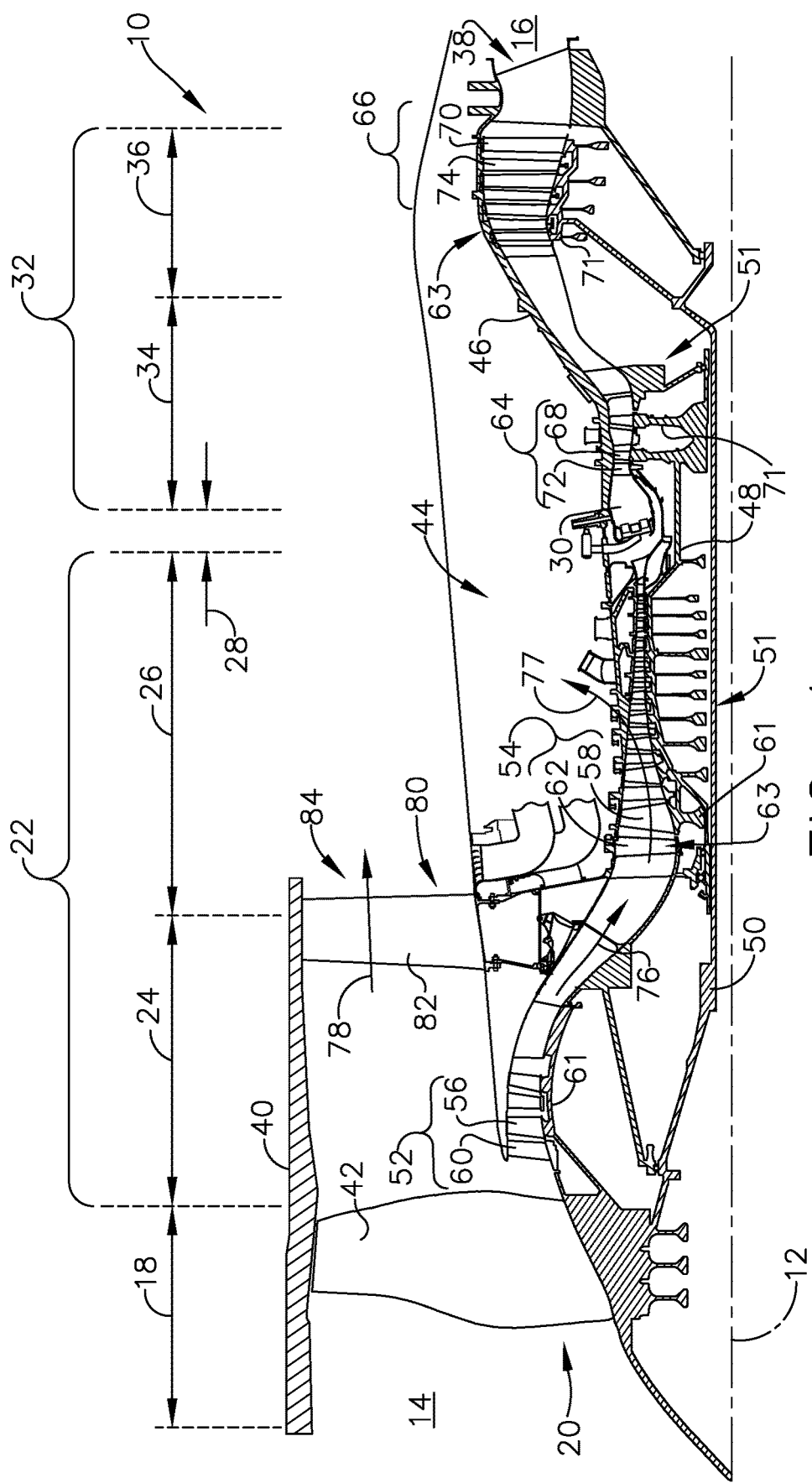
FIG. 1 is a schematic cross-sectional diagram of a gas turbine engine for an aircraft.

Aspects of the disclosure described herein are directed to a set of cooling conduits for a trailing edge cooling passage for an engine component, such as an airfoil. For purposes of illustration, the present disclosure will be described with respect to a blade for the turbine for an aircraft gas turbine engine. It will be understood that while described in reference to a blade, the concepts described herein can have equal applicability to additional engine components, including but not limited to, vanes, shrouds, or combustion liners. It will be further understood, however, that aspects of the disclosure described herein are not so limited and may have general applicability within an engine, including compressors, as well as in non-aircraft applications, such as other mobile applications and non-mobile industrial, commercial, and residential applications. Additionally, it will be understood that while the cooling conduits are described in reference to a trailing edge, the concepts as described herein can have equal applicability to other regions of an airfoil including but not limited to the leading edge, platform, or tip.

As used herein, the term "forward" or "upstream" refers to moving in a direction toward the engine inlet, or a component being relatively closer to the engine inlet as compared to another component. The term "aft" or "downstream" used in conjunction with "forward" or "upstream" refers to a direction toward the rear or outlet of the engine or being relatively closer to the engine outlet as compared to another component. Additionally, as used herein, the terms "radial" or "radially" refer to a dimension extending between a center longitudinal axis of the engine and an outer engine circumference. Furthermore, as used herein, the term "set" or a "set" of elements can be any number of elements, including only one.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

Referring to FIG. 1, an engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12. The HP compressor 26, the combustor 30, and the HP turbine 34 form a core 44 of the engine 10, which generates combustion gases. The core 44 is surrounded by core casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20. The spools 48, 50 are rotatable about the engine centerline and couple to a plurality of rotatable elements, which can collectively define a rotor 51.

The LP compressor 24 and the HP compressor 26 respectively include a plurality of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned upstream of and adjacent to the rotating blades 56, 58. It is noted that the number of blades, vanes, and compressor stages shown in FIG. 1 were selected for illustrative purposes only, and that other numbers are possible.

The blades 56, 58 for a stage of the compressor mount to a disk 61, which mounts to the corresponding one of the HP and LP spools 48, 50, with each stage having its own disk 61. The vanes 60, 62 for a stage of the compressor mount to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

The blades 68, 70 for a stage of the turbine can mount to a disk 71, which is mounts to the corresponding one of the HP and LP spools 48, 50, with each stage having a dedicated disk 71. The vanes 72, 74 for a stage of the compressor can mount to the core casing 46 in a circumferential arrangement.

Complementary to the rotor portion, the stationary portions of the engine 10, such as the static vanes 60, 62, 72, 74 among the compressor and turbine section 22, 32 are also referred to individually or collectively as a stator 63. As such, the stator 63 can refer to the combination of non-rotating elements throughout the engine 10.

In operation, the airflow exiting the fan section 18 splits such that a portion of the airflow is channeled into the LP compressor 24, which then supplies pressurized air 76 to the HP compressor 26, which further pressurizes the air. The pressurized air 76 from the HP compressor 26 mixes with fuel in the combustor 30 where the fuel combusts, thereby generating combustion gases. The HP turbine 34 extracts some work from these gases, which drives the HP compressor 26. The HP turbine 34 discharges the combustion gases into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

A portion of the pressurized airflow 76 can be drawn from the compressor section 22 as bleed air 77. The bleed air 77 can be drawn from the pressurized airflow 76 and provided to engine components requiring cooling. The temperature of pressurized airflow 76 entering the combustor 30 is significantly increased. As such, cooling provided by the bleed air 77 is necessary for operating of such engine components in the heightened temperature environments.

A remaining portion of the airflow 78 bypasses the LP compressor 24 and engine core 44 and exits the engine assembly 10 through a stationary vane row, and more particularly an outlet guide vane assembly 80, comprising a plurality of airfoil guide vanes 82, at the fan exhaust side 84. More specifically, a circumferential row of radially extending airfoil guide vanes 82 are utilized adjacent the fan section 18 to exert some directional control of the airflow 78.

Some of the air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 2:
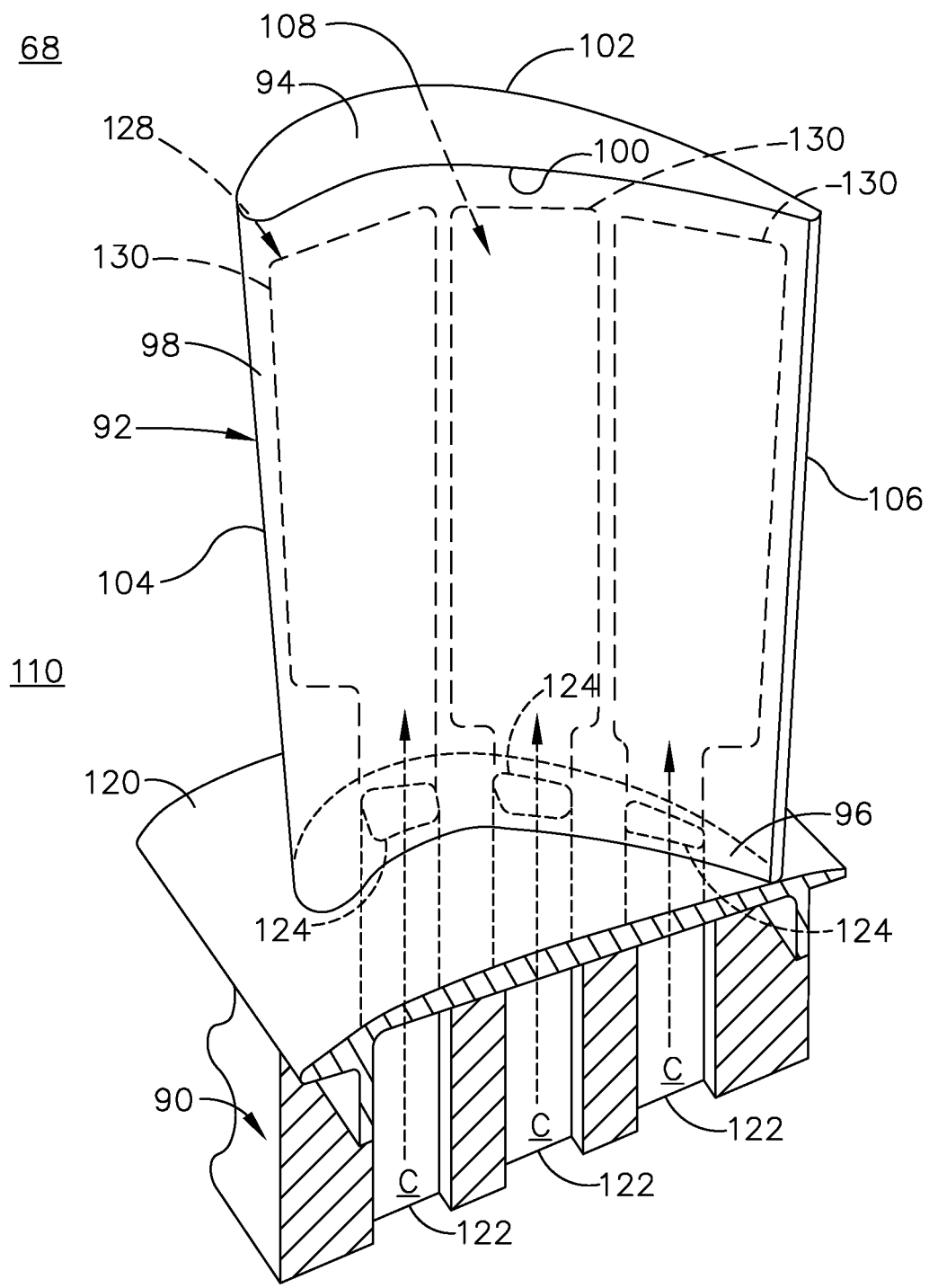
FIG. 2 is perspective view of an engine component in the form of an airfoil for the engine of FIG. 1.

Referring now to FIG. 2, an engine component illustrated in the form of the turbine blade 68 includes a dovetail 90 and an airfoil 92. The airfoil 92 includes a tip 94 and a root 96 defining a span-wise direction therebetween. In the case of a stationary vane or nozzle, the tip 94 can be the furthest radial extent of the airfoil 92. The airfoil 92 further includes an outer wall 98 defining a pressure side 100 and a suction side 102 connected at a leading edge 104 and a trailing edge 106, defining a chord-wise direction extending between the leading edge 104 and the trailing edge 106. The outer wall 98 separates an interior 108 of the airfoil 92 from an exterior 110.

The airfoil 92 mounts to the dovetail 90 at a platform 120 at the root 96. The airfoil 92, dovetail 90, and the platform 120 can be integral elements, such as formed by casting, while it is contemplated that the airfoil 92, platform 120, and dovetail 90 can be joined together. The platform 120 helps to radially contain a turbine engine mainstream airflow driven by the blade 68. The dovetail 90 can be configured to mount to a turbine rotor disk 71 on the engine 10 of FIG. 1.

The dovetail 90 further includes at least one inlet passage 122, shown as a three exemplary inlet passages 122, each extending through the dovetail 90 and the platform 120 to provide internal fluid communication with the airfoil 92 at a passage outlet 124 positioned at the root 96 on the platform 120. It should be appreciated that the dovetail 90 is shown in cross-section, such that the inlet passages 122 are housed within the dovetail 90.

A cooling circuit 128 can include one or more cooling passages 130 are formed in the airfoil 92 extending in the substantially span-wise direction. 'Substantially' as used herein in combination with a directional reference, such as span-wise, chord-wise, radially, or axially, for example, can include parallel to that direction or slightly varying therefrom, such as by up to about five degrees. The cooling passage 130 fluidly couples with a passage outlet 124. While illustrated as three cooling passages 130, it should be understood that any number of cooling passage 130 can be formed in the airfoil 92, and should not be limited by the structure or organization as shown.

Figure 3:
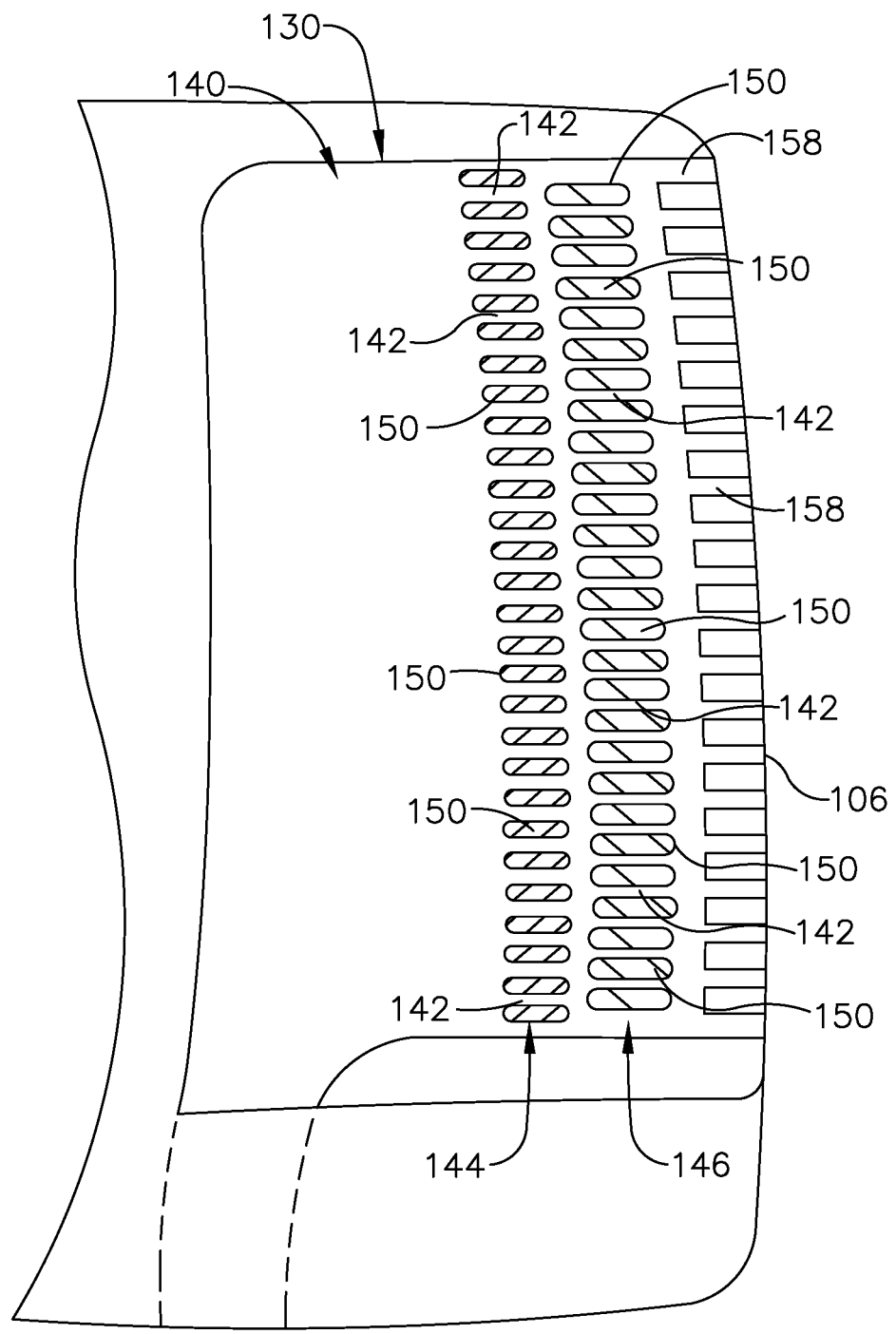
FIG. 3 is a schematic view of a cooling passage for the airfoil of FIG. 2 having rows of cooling conduits.

Referring now to FIG. 3, the cooling passage 130 can be a trailing edge cooling passage 140 defined in part by the trailing edge 106. A plurality of interior walls 150 are provided in the trailing edge cooling passage 140 defining a plurality of cooling conduits 142 extending between the adjacent interior walls 150. The cooling conduits 142 can extend in the chord-wise direction or the axial direction, while any directionality is contemplated. Here, the interior walls 150 are arranged into a first row 144 and a second row 146, arranging the cooling conduits 142 into the first and second rows 144, 146. The second row 146 can be positioned aft of the first row 144 or closer to the trailing edge 106. While the cooling conduits 142 are described as provided in an exemplary trailing edge cooling passage 140, it should be appreciated that the cooling conduits 142 can be provided in any cooling passage 130, provided anywhere within an airfoil or engine component.

The interior walls 150, for example, can extend at least partially through the airfoil 92 in a direction substantially orthogonal to the chord-wise direction of the cooling conduits 142. In one example, the interior walls 150 can be formed as a pin bank, with elongated pins adapted to form the cooling conduits 142.

A set of trailing edge exhaust holes 158 can be formed at the trailing edge extending through the outer wall 98 from the cooling passage 140. The trailing edge exhaust holes 158 can be positioned aft of the cooling conduits 142 and can fluidly couple the trailing edge cooling passage 140 to the trailing edge 106.

Figure 4:
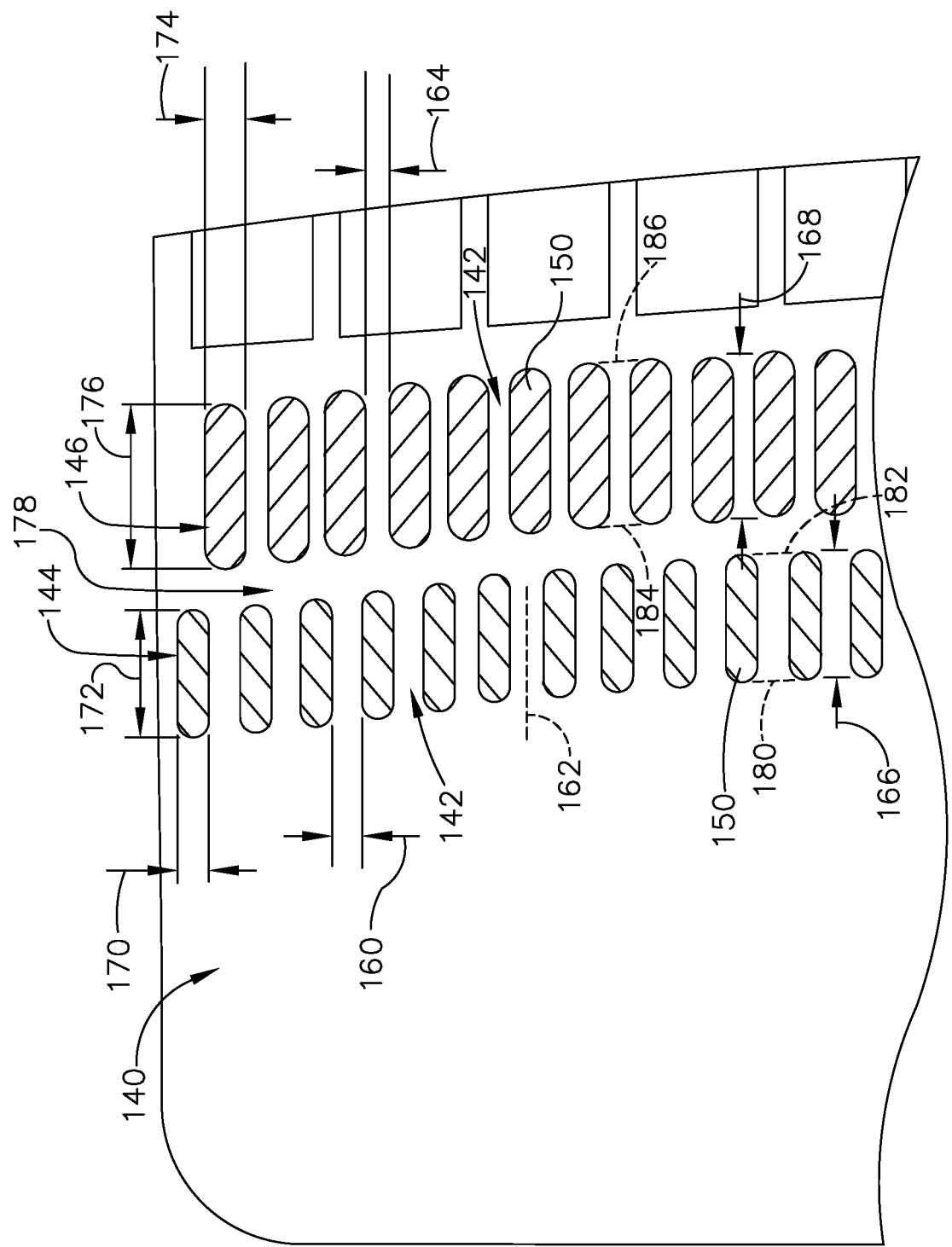
FIG. 4 is an enlarged schematic view of the cooling conduits of FIG. 3.

Referring now to FIG. 4, the cooling conduits 142 can have a cross-sectional area 160, 164, which can be determined based upon a diameter of the cooling conduits 142. In such a case, the cooling conduits 142 can substantially cylindrical, defining a circular cross-sectional shape. The cross-sectional area 160, 164 can be defined orthogonal to a longitudinal centerline 162 extending through the cooling conduits 142. The cross-sectional area 160 for the cooling conduits 142 arranged in the first row 144 can be the same along the entire row 144. Similarly, the cooling conduits 142 arranged in the second row 146 can all have the same cross-sectional area 164 along the entire row 146. The cross-sectional area 160 for the cooling conduits 142 in the first row 144 can be greater than the cross-sectional area 164 for the cooling conduits 142 in the second row 146. As such, the cooling conduits 142 in the second row 146 operate to meter a flow passing through the plurality of the cooling conduits 142, as well as the trailing edge cooling passage 140. In yet another example, the cross-sectional areas 160, 164 can vary discretely or locally among the cooling conduits 142.

Each cooling conduit 142 in the first row 144 can have a first length 166 and each cooling conduit 142 in the second row 146 can have a second length 168. The second length 168 can be greater than the first length 166, while any length is contemplated. In another example, the first and second lengths 166, 168 can be equal. In yet another example, the lengths 166, 168 can vary discretely or locally among the cooling conduits 142.

The interior walls 150 in the first row 144 can be sized to define the cross-sectional area 160 for the cooling conduits 142 in the first row 144 and the interior walls 150 in the second row 146 can be sized to define the cross-sectional area 160 for the cooling conduits 142 in the second row 146. As such, the interior walls 150 in the first row 144 can have a width 170 and a length 172 that is less than a width 174 and a length 176 for the interior walls 150 in the second row 146. The interior walls 150 in the first row 144 and the second row 146 can be spaced from one another, axially or in the chord-wise direction, such that a junction 178 is formed between the first row 144 and the second row 146, fluidly coupling the cooling conduits 142 in the first and second rows 144, 146.

Each cooling conduit 142 in the first row 144 can have a first inlet 180 and a first outlet 182 and each cooling conduit 142 in the second row 146 can have a second inlet 184 and a second outlet 186. The offset arrangement between the first row 144 and the second row 146 orients the first outlets 182 adjacent to the interior walls 150 in the second row 146 and the second inlets 184 adjacent to the interior walls in the first row 144. In an offset arrangement, the junction 178 fluidly couples the first outlets 182 to the second inlets 184, such that all cooling conduits 142 are in fluid communication.

Figure 5:
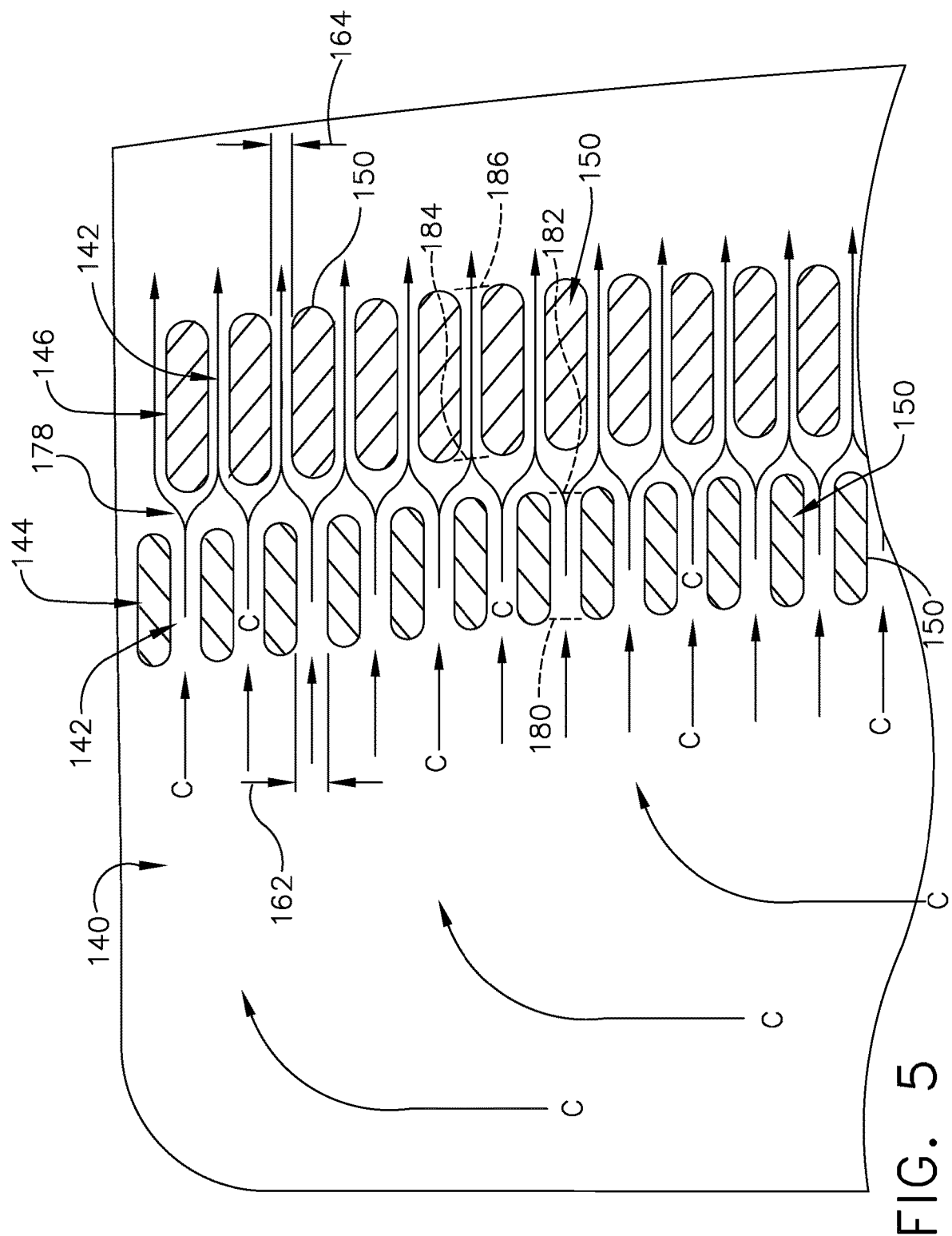
FIG. 5 is a schematic view illustrating a flow passing through the cooling conduits of FIG. 4.

Referring now to FIG. 5, a flow of fluid, illustrated as an exemplary flow of cooling fluid C, can pass through the trailing edge cooling conduit 140. The flow of cooling fluid C can be provided to the trailing edge cooling conduit 140 as a flow of bleed air ducted from other areas of the engine, for example. The cooling fluid C can pass into the cooling conduits 142 in the first row 144. Because of the offset arrangement of the cooling conduits 142, the cooling fluid C can exhaust through the first outlets 182 of the cooling conduits 142 in the first row 144 and impinge upon the walls 150 of the interior walls 150 in the second row 146. The cooling flow C impinging upon the walls 150 of the interior walls 150 provides for increased heat transfer along the cooling conduits 142 and the interior walls 150 in the second row 146. Additionally, the impinging flow can provide for turbulence or non-laminar flow patterns at the cooling conduits 142, which can further increase local heat transfer coefficients. The increased heat transfer and heat transfer coefficients provide for improved cooling of the airfoil with in the trailing edge cooling passage 140.

During operation, particulate matter such as dust may clog or close one or more cooling conduits 142. The junction 178 provides for fluid communication in the span-wise direction among all cooling conduits 142, which can provide improved cooling for the cooling conduits 142 in the instance that one or more cooling conduits 142 becomes clogged. Furthermore, the offset orientation of the first and second rows 144, 146 can reduce the instance of collection of particulate matter within the cooling conduits 142 by increasing local turbulence of the flow of cooling fluid C.

Further still, the cross-sectional area 164 of the cooling conduits 142 in the second row 146 provides for metering the flow of fluid C through the trailing edge cooling passage 140. A minimum cross-sectional flow area through the trailing edge cooling passage 140 through the cooling conduits 142 in the second row 144 defines a throat that operates to meter the flow of cooling fluid C. The metering of the flow of fluid C in combination with the improved heat transfer coefficients can provide for reducing the required cooling flows through the airfoil 92, which can increase overall engine efficiency and reduce required bleed airflows.

Figure 6:
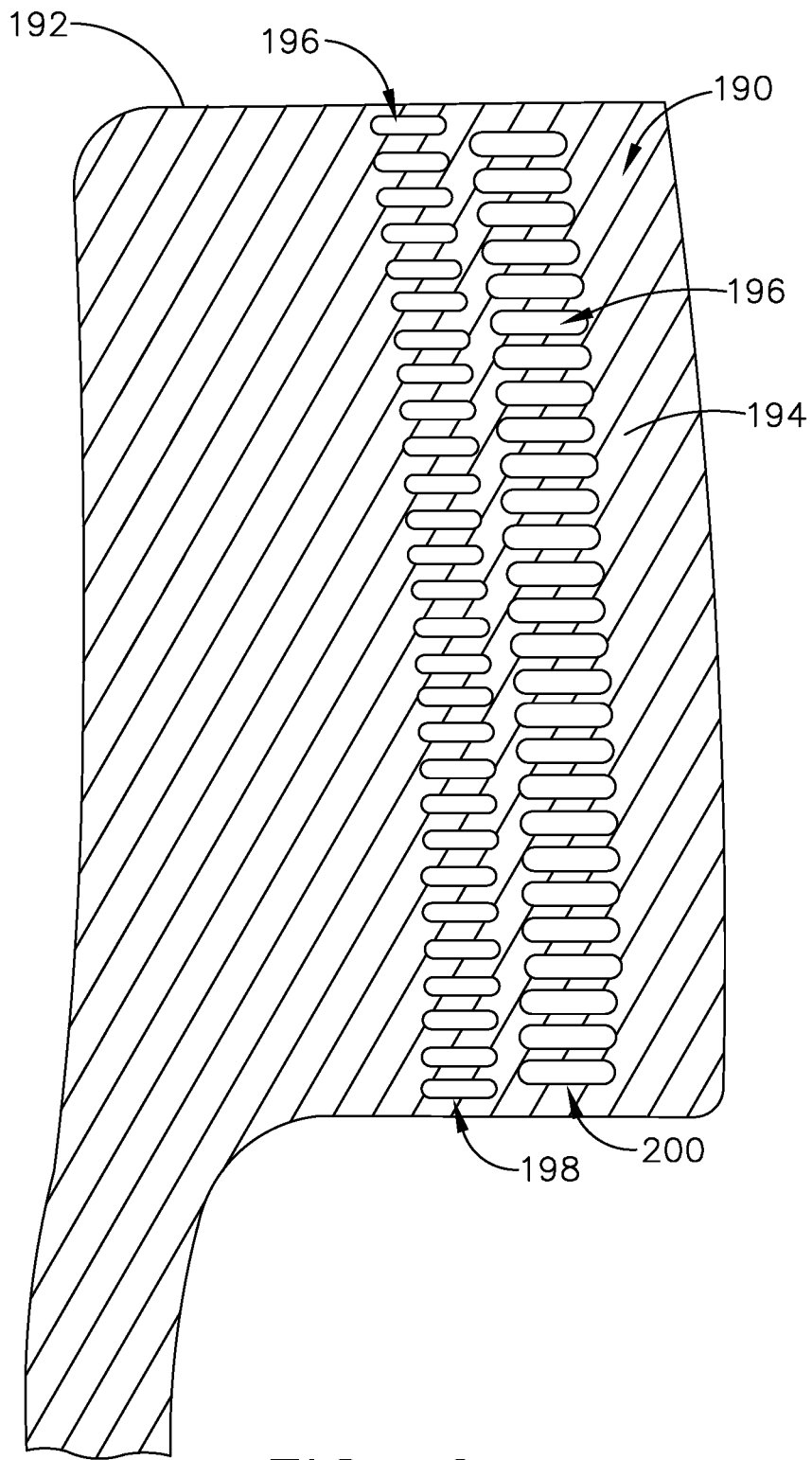
FIG. 6 is a schematic view of a core used in forming the cooling conduits of FIG. 3.

Referring now to FIG. 6, an exemplary core 190 is illustrated for an exemplary airfoil, such as the airfoil 92 of FIG. 2. The core 190 can be utilized in casting an airfoil, or casting a cooling passage within the airfoil, such as the trailing edge cooling passage 140 as described herein. The core 190 can include a body 194. A plurality of apertures 196 can be formed in the body 194, arranged into a first row 198 and a second row 200, adapted to form the interior walls 150 as described in FIGS. 3-5. The apertures 196 provided in the core 190 can be sized to form the cooling conduits 142 of FIGS. 3-5, with the apertures 196 in the first row 198 being spaced further from one another to provide for a greater cross-sectional area for cooling conduits 142 formed in the first row 198. The apertures 196 in the second row 200 can be sized such that the cross-sectional area for cooling conduits 142 formed in the second row 200 are smaller than that of the first row 198. Additionally, the junction 178 of FIG. 5 can be formed by the ceramic core material of the core 190 in FIG. 6. The junction 178 provides for structural stability and stiffness for improved producibility and manufacturability during core formation or casting.

During manufacture, the core 190 can be used to form the airfoil 92 or the cooling passage 130 as described in FIGS. 3-5. An airfoil can be cast around the core 190, and the core 190 can be removed from the cast airfoil, such as by leaching or any suitable method of removal. During casting, an exit aperture (now shown) can be provided in the formed component, permitting leaching or removal of the core materials. Core leaching or removal can deform the core within the cast component, facilitating removal through such an exit aperture. The apertures 196 can form the cooling conduits 142 as described herein, having the first and second rows, offset organization, and the variable cross-sectional areas.

In one alternative example, the airfoil 92 of FIGS. 3-5 can be formed by additive manufacturing, such as 3D printing, or can be formed by other additive manufacturing methods such as electroplating where a removable core, such as the core of FIG. 6, can be used to electroform the airfoil or component.

Figure 7:
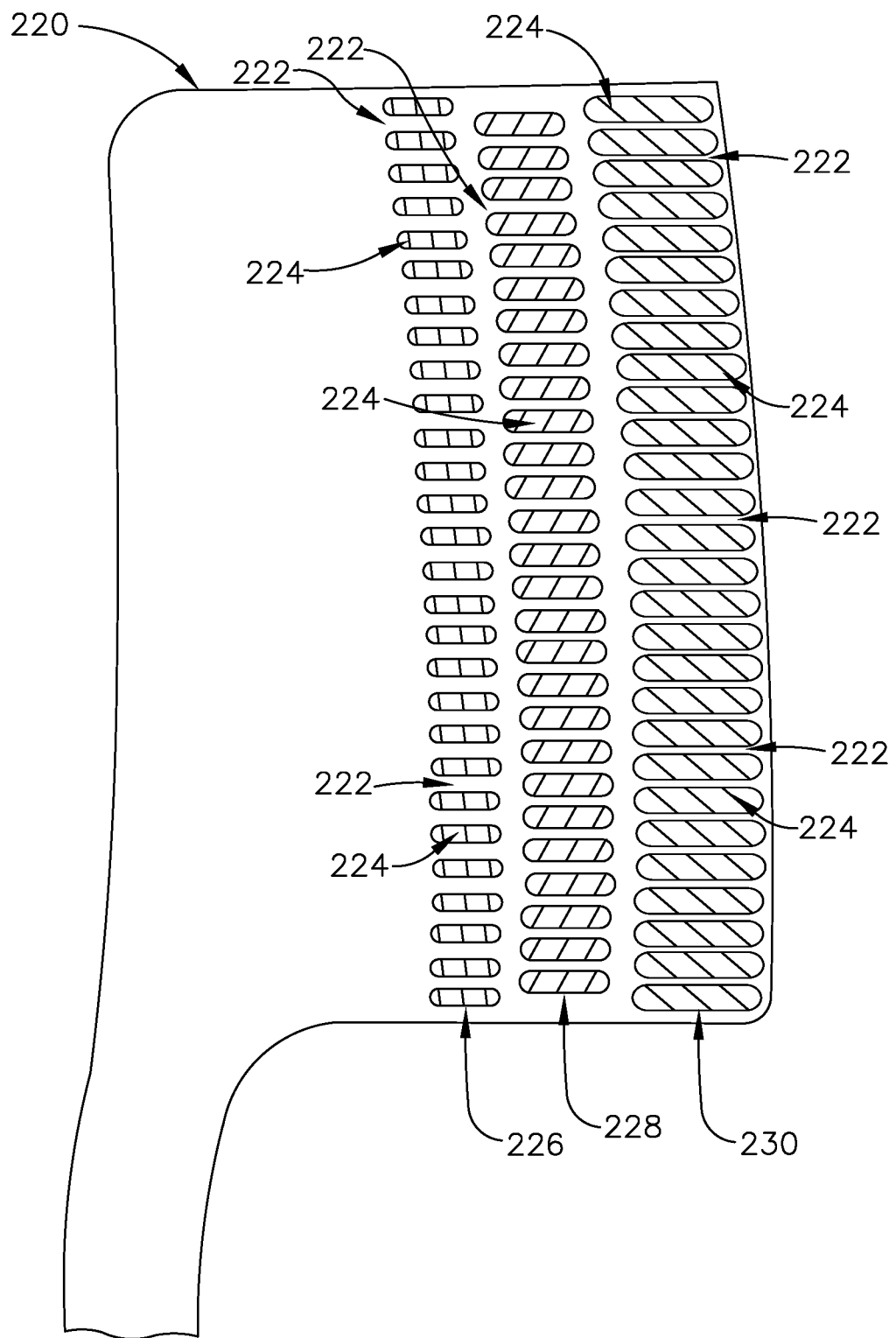
FIG. 7 is a schematic view of an alternative engine component having cooling conduits arranged into three rows.

Referring now to FIG. 7, another exemplary airfoil 220 is illustrated having a plurality of cooling conduits 222 and apertures 224. The cooling conduits 222 and apertures 224 are arranged into a first row 226, a second row 228, and a third row 230. The cooling conduits 222 in the second row 228 can have a smaller cross-sectional area than the cooling conduits 222 in the first row 226. Similarly, the cooling conduits 222 in the third row 230 can have a smaller cross-sectional area than the cooling conduits 222 in the second row. As such, it should be appreciated that the cooling conduits 222 can be organized into any number of rows, with each consecutive row in a downstream or aft direction can have decreasing cross-sectional areas, such that the last row of cooling conduits 222 operates to meter the flow of fluid through the airfoil 220.

Additionally, the cooling conduits 222 in the third row 230 can be offset from the cooling conduits 222 in the second row 228, such that a flow exhausting from the cooling conduits 222 in the second row 228 impinges upon the apertures 224 of the third row 230 in the same manner as the flow exhausting form the first row impinges upon the aperture walls of the second row, as described in FIG. 5. After exhausting from the third row 230, the flow can exhaust through a trailing edge 232, such as through apertures formed in the trailing edge or exhaust holes similar to the exhaust holes 158 of FIG. 3.

A method of cooling an airfoil for a turbine engine, with the airfoil having an inlet, an interior, and a plurality of exhaust holes from the interior to an exterior of the airfoil, can include: directing a flow of fluid from the inlet to the plurality of exhaust holes through a first set of cooling conduits arranged in the interior in a first row having a first cross-sectional area; and directing the flow of fluid through a second set of cooling conduits arranged in the interior in a second row downstream of the first row and having a second cross-sectional area less than the first cross-sectional area. The first set of cooling conduits arranged in the first row can be the cooling conduits 142 in the first row 144 and the second set of cooling conduits arranged in the second row can be the cooling conduits 142 in the second row 146 of FIG. 3, for example.

The method can further include impinging the flow of fluid on the second set of cooling conduits by positioning the second row offset from the first row.

Further still, the method can include directing the flow of fluid through a third set of cooling conduits arranged in a third row downstream of the second row and having a third cross-sectional area less than that of the second cross-sectional area. The third row of cooling conduits can be similar to that of the third row 230 in FIG. 7

It should be appreciated that application of the disclosed design is not limited to turbine engines with fan and booster sections, but is applicable to turbojets and turbo engines as well.

To the extent not already described, the different features and structures of the various embodiments can be used in combination, or in substitution with each other as desired. That one feature is not illustrated in all of the embodiments is not meant to be construed that it cannot be so illustrated, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An airfoil for a turbine engine, the airfoil comprising:
an outer wall defining an interior and including a pressure side and a suction side extending axially between a leading edge and a trailing edge defining a chord-wise direction and extending radially between a root and a tip defining a span-wise direction; and a cooling circuit defining a flow direction and comprising a plurality of cooling conduits provided in the interior and arranged into a first row and a second row downstream of the first row relative to the flow direction, with the cooling conduits in the first row having a greater cross-sectional area than the cooling conduits in the second row such that every consecutive row in a downstream or aft direction has a decreasing cross-sectional area.

2. The airfoil of claim 1 further comprising a cooling passage at least partially forming the cooling circuit and having the plurality of cooling conduits provided in the cooling passage.

3. The airfoil of claim 2 wherein the cooling passage is a trailing edge cooling passage.

4. The airfoil of claim 3 further comprising a plurality of trailing edge exhaust holes having an inlet in fluid communication with the second row of cooling conduits and an outlet provided on the trailing edge.

5. The airfoil of claim 1 wherein a length of the cooling conduits in the second row is greater than a length of the cooling conduits in the first row.

6. The airfoil of claim 1 further comprising a plurality of interior walls arranged in the first and second rows defining the plurality of cooling conduits.

7. The airfoil of claim 6 wherein the interior walls in the second row have a greater cross-sectional area than the interior walls in the first row.

8. The airfoil of claim 1 wherein the cooling conduits in the first row are offset from the cooling conduits in the second row.

9. The airfoil of claim 8 further comprising a junction between the first row and the second row fluidly coupling the cooling conduits in the first row to the cooling conduits in the second row.

10. The airfoil of claim 9 further comprising a third row of cooling conduits arranged downstream of the second row of cooling conduits wherein the third row of cooling conduits includes a smaller cross-sectional area than the second row of cooling conduits.

11. The airfoil of claim 10 further comprising a second junction between the second row and the third row fluidly coupling the cooling conduits in the second row to the cooling conduits in the third row.

12. A component for a turbine engine, the component comprising:
a plurality of interior walls defining a plurality of cooling conduits arranged into a first row and a second row downstream of the first row relative to a flow direction through the component, with the cooling conduits in the second row having a smaller cross-sectional area than the cooling conduits in the first row such that every consecutive row in a downstream or aft direction has a decreasing cross-sectional area.

13. The component of claim 12 wherein a length of the cooling conduits in the second row is greater than a length of the cooling conduits in the first row.

14. The component of claim 12 wherein a cross-sectional area for the cooling conduits in the first row is more than a cross-sectional area for the cooling conduits in the second row.

15. The component of claim 14 wherein cross-sectional area for the cooling conduits in the first row are all the same and the cross-sectional area for the cooling conduits in the second row are all the same.

16. The component of claim 12 wherein the cooling conduits in the first row are offset from the cooling conduits in the second row.

17. The component of claim 16 wherein the first and second rows are spaced from one another defining a junction between the first row and the second row fluidly coupling the cooling conduits in the first row to the cooling conduits in the second row.

18. A method of cooling an airfoil in a turbine engine, the airfoil having an inlet, an interior, and a plurality of exhaust holes from the interior to an exterior of the airfoil, the method comprising:
directing a flow of fluid from the inlet to the plurality of exhaust holes through a first set of cooling conduits arranged in the interior in a first row having a first cross-sectional area; and
directing the flow of fluid through a second set of cooling conduits arranged in the interior in a second row downstream of the first row and having a second cross-sectional area less than the first cross-sectional area such that every consecutive row in a downstream or aft direction has a decreasing cross-sectional area.

19. The method of claim 18 further comprising impinging the flow of fluid on the second set of cooling conduits by positioning the second row offset from the first row.

20. The method of claim 18 further comprising directing the flow of fluid through a third set of cooling conduits arranged in a third row downstream of the second row and having a third cross-sectional area less than that of the second cross-sectional area.

* * * * *